M. BRIGGS.
APPARATUS FOR PRESERVING EGGS.
APPLICATION FILED JUNE 4, 1906.

899,382.  Patented Sept. 22, 1908.

ATTEST.
H. J. Fletcher.
M. P. Smith.

INVENTOR.
MYRON BRIGGS.
BY Higdon & Longan.
ATTY'S.

UNITED STATES PATENT OFFICE.

MYRON BRIGGS, OF ST. LOUIS, MISSOURI.

APPARATUS FOR PRESERVING EGGS.

No. 899,382.　　　　Specification of Letters Patent.　　　Patented Sept. 22, 1908.

Application filed June 4, 1906. Serial No. 320,049.

*To all whom it may concern:*

Be it known that I, MYRON BRIGGS, a citizen of the United States, and resident of St. Louis, Missouri, have invented certain new and useful Improvements in Apparatus for Preserving Eggs, of which the following is a specification containing a full, clear, and exact description, reference being had to the accompanying drawings, forming a part hereof.

My invention relates to an apparatus for preserving eggs, and the object of my invention is to provide simple means for preserving and keeping eggs for an indefinite length of time, and which eggs are in appearance and taste in every way similar to perfectly fresh eggs.

My invention consists in a tank, or receptacle, of suitable size, and a number of small boxes, or containers, constructed of reticulated material, and a quantity of preserving compound in liquid form.

Figure 1:
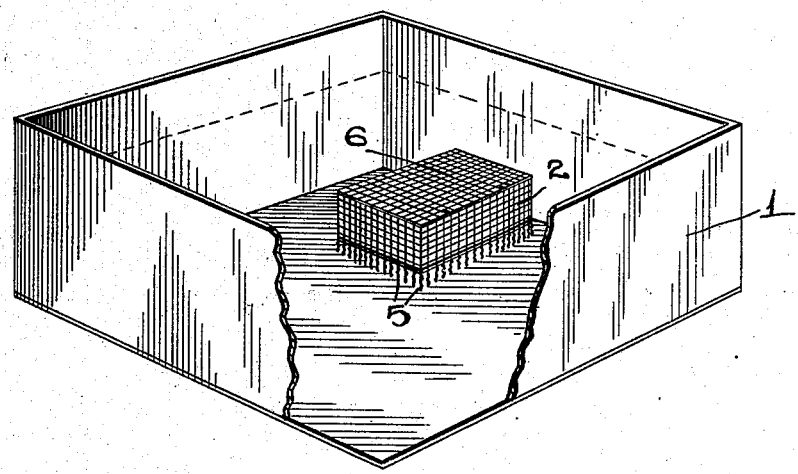
Figure 2:
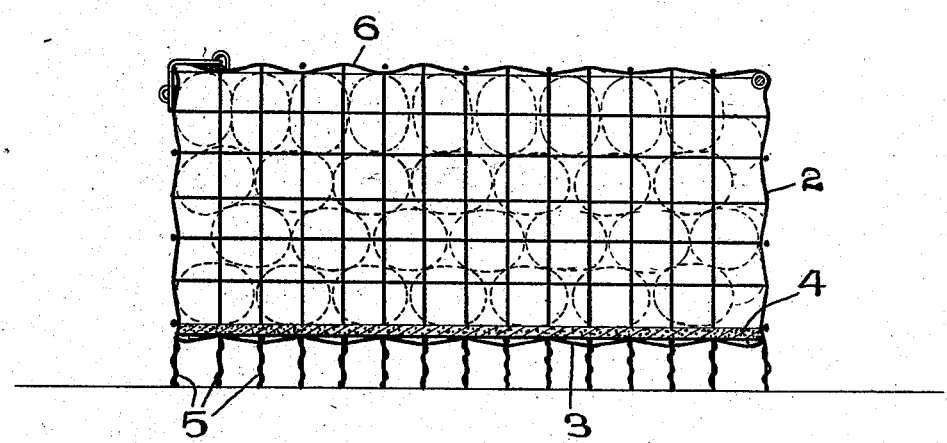

In the drawings, Figure 1 is a perspective view of the large tank, or receptacle, with one corner thereof broken away, and showing 1 of the small reticulated boxes; Fig. 2 is a longitudinal section taken through the center of one of the reticulated boxes in which the eggs are located.

Referring by numerals to the accompanying drawings: 1 designates a tank, or receptacle, which is preferably constructed of galvanized sheet metal, and of suitable size and convenient form.

2 designates a small box, or container, of reticulated metal, such as wire mesh, approximately rectangular in form, and provided with a fixed bottom 3, on which is located a sheet 4, of asbestos, or analogous material. This sheet of asbestos acts as a cushion for the lower layer of eggs positioned in the container, and said sheet being fibrous, readily absorbs the preserving compound, so that said compound comes in direct contact with the portions of the shells of the eggs which contact with the asbestos sheet.

It is essential that the sheet or cushion 4 be constructed of a fibrous material, and a material which will not decompose or be in any way affected by the preserving liquid, in which said sheet or cushion is submerged for a considerable length of time; and for this reason asbestos is utilized in forming said sheet or cushion, as asbestos is both fibrous and practically indestructible.

Extending downwardly from the bottom of this box, or container, is a series of short legs 5, which support the bottom of the box some little distance above the floor, or bottom, of the tank 1, thus permitting the preserving compound to pass beneath the container to entirely surround the eggs contained therein.

6 designates a lid of reticulated material, and which is adapted to close the top of the box, or container.

In the preservation of eggs with the apparatus as described, I fill a number of the boxes, or containers, 2 with eggs, after which the lid 6 is securely fastened to close the boxes, or containers. The boxes, or containers, filled with the eggs are now located on the bottom of the tank 1, and then said tank is filled with a suitable preserving compound in liquid form, so that all the boxes, or containers, are entirely submerged. This preserving compound will readily pass through the top and sides of all of the boxes, and fill all of the pores in the egg shells, which is a particular and necessary feature in the preserving of eggs. At suitable periods of time, for instance, every ten days or two weeks, the boxes containing the eggs are turned upside down while submerged in the tank 1, which action stirs the preserving compound, and with one movement reverses the position of all the eggs in each box, or container.

My improved apparatus is very simple, and is particularly adapted for small dealers, or for farmers and other persons who desire at certain times of the year to preserve and keep their supply of eggs until the same can be profitably marketed.

I claim:

In an apparatus for preserving eggs, a rectangular egg container constructed of wire screen, legs formed on the sides and ends of the bottom of the container, which legs are constructed of the wires of which the container is formed, an elastic porous cushion of asbestos located in the bottom of the container, and a wire screen cover secured to the top of said container.

In testimony whereof, I have signed my name to this specification, in presence of two subscribing witnesses.

MYRON BRIGGS.

Witnesses:
　E. M. HARRINGTON,
　M. P. SMITH.